US009135813B2

(12) United States Patent
Stratton et al.

(10) Patent No.: US 9,135,813 B2
(45) Date of Patent: Sep. 15, 2015

(54) REMOTE LOCKOUT/TAGOUT

(71) Applicant: Caterpillar, Inc., Peoria, IL (US)

(72) Inventors: Kenneth L. Stratton, Dunlap, IL (US); Gary Cook, Washington, IL (US); Steve McDonald, Paddington Queensland (AU)

(73) Assignees: Caterpillar, Inc., Peoria, IL (US); Leighton Contractors, Chatswood (AU)

( * ) Notice: Subject to any disclaimer, the term of this patent is extended or adjusted under 35 U.S.C. 154(b) by 207 days.

(21) Appl. No.: 13/725,129

(22) Filed: Dec. 21, 2012

(65) Prior Publication Data

US 2014/0176303 A1 Jun. 26, 2014

(51) Int. Cl.

| | |
|---|---|
| ***G05B 19/00*** | (2006.01) |
| ***G05B 23/00*** | (2006.01) |
| ***G06F 7/00*** | (2006.01) |
| ***G06F 7/04*** | (2006.01) |
| ***G06K 19/00*** | (2006.01) |
| ***G08B 29/00*** | (2006.01) |
| ***G08C 19/00*** | (2006.01) |

(Continued)

(52) U.S. Cl.

CPC .................................... *G08C 17/02* (2013.01)

(58) Field of Classification Search

CPC . G06Q 10/06; G06Q 10/0832; G06Q 20/325; G06Q 50/265; G06Q 10/00; G06Q 10/06312; G06Q 10/0637; G06Q 50/28; G06Q 20/32; B66F 9/24; G05D 2201/0216; G06K 7/10128; G06K 19/0723; G06K 7/10237; G06K 2017/0045; G06K 2017/0051; G08B 13/2462; G08B 13/1427; G08B 21/0263; G08B 25/009; G08B 7/06; H04Q 2209/47; H04Q 9/00; G07C 11/00; G07C 3/00; G07C 9/0057; H04W 12/08; B60R 25/24; B60R 25/23; B60R 25/241; B60R 2325/105; B60R 25/2009; G05B 1/01; G05B 15/02; G05B 19/0426; G05B 2219/23258; G05B 2219/24055; G05B 2219/24167; G05B 2219/25067; G05B 2219/25428; G05B 2219/31104; G05B 2219/33125; G06F 21/35; G06F 13/4068; G06F 21/31; G06F 21/44; G08C 17/02; H02H 5/12

USPC ........... 340/5.61, 5.64, 5.63; 341/176; 708/28

See application file for complete search history.

(56) References Cited

U.S. PATENT DOCUMENTS 7,079,813 B2 * 7/2006 Szarka et al. ................ 455/66.1
7,140,101 B2 11/2006 Cheng et al.

(Continued)

OTHER PUBLICATIONS

Lockout—Tag out—The University of Tennessee at Chattanooga, Jun. 28, 2013 <https://www.google.com/url?paf=&q=http://www.utc.edu/safety-risk-management/docs/doc-files/programs-plans/lockout-tag-out.docx &usg=AFQjCNHcN8k7ZcOs6BdTWsjUio1So26vjA, all pages.*

(Continued)

*Primary Examiner* — Jennifer Mehmood
*Assistant Examiner* — Emily C Terrell
(74) *Attorney, Agent, or Firm* — Miller, Matthias & Hull LLP

(57) ABSTRACT

A remote lock-out/tag-out system and method allow a remote service technician to remotely lock-out a machine via a remote wireless control device. In one aspect, the lock-out initiation request is sent from the remote wireless control device to the machine. The remote wireless control device then receives from the machine an indication that the machine location and state are suitable for lock-out. In response, the remote wireless control device sends a lock-out command to the machine.

20 Claims, 5 Drawing Sheets

(51) Int. Cl.

| | |
|---|---|
| ***H04B 1/00*** | (2006.01) |
| ***H04B 1/38*** | (2015.01) |
| ***H04B 3/00*** | (2006.01) |
| ***H04Q 1/00*** | (2006.01) |
| ***H04Q 9/00*** | (2006.01) |
| ***G08C 17/02*** | (2006.01) |

(56) References Cited

U.S. PATENT DOCUMENTS

| | | | | |
|---|---|---|---|---|
| 7,643,938 | B2 * | 1/2010 | Adachi et al. | 701/468 |
| 7,873,455 | B2 * | 1/2011 | Arshad et al. | 701/50 |
| 2002/0195275 | A1 * | 12/2002 | Brand et al. | 175/24 |
| 2007/0203812 | A1 | 8/2007 | Donnelli et al. | |
| 2010/0039247 | A1 * | 2/2010 | Ziegler et al. | 340/436 |
| 2010/0280872 | A1 * | 11/2010 | Scholte-Wassink | 705/9 |
| 2013/0214903 | A1 * | 8/2013 | Kalous et al. | 340/5.61 |

OTHER PUBLICATIONS

Murray State University, Lockout/Tagout Program for Machines and Equipment, Jul. 2004, all pages especially section X.*

Farm Safety Association Factsheets 2006, Section on agricultural machinery hazards and lockouts.*

* cited by examiner

REMOTE LOCKOUT/TAGOUT

TECHNICAL FIELD OF THE DISCLOSURE

The present disclosure relates to machine access and, more particularly, relates to a system and method for remotely restricting and allowing access to a machine during and after maintenance operations.

BACKGROUND OF THE DISCLOSURE

Many large machines used for mining, excavation, ground preparation, and other large scale tasks must be carefully maintained to ensure proper performance for the operator and to ensure continued compliance with appropriate standards and regulations. Due to the complex nature of such machines, they are typically maintained by specialized personnel rather than by the operator him or herself. When maintenance is needed, there is traditionally a process of ceding control of the machine from the operator to the maintaining personnel (herein "maintainer" or "service technician") prior to maintenance, and of ceding control back to the operator when the required maintenance is complete. The steps typically required before service can be performed on a machine are referred to as lock-out/tag-out procedures. Such procedures may include turning the engine off, putting the machine transmission in park/neutral and so on.

The inventors have observed, however, that there is a risk of injury in the lock-out/tag-out process, in that personnel involved in the task must typically climb onto or get close to the machine to access a manual lock or other lockout mechanism. Although certain attempts have been made by others to improve the safety of personnel in such situations, none have been entirely successful in this endeavor. For example, U.S. Pat. No. 7,410,101 entitled "Technical Safety Confirmation" teaches a system for providing a safety confirmation or hazard warning to a technician in the field by scanning an equipment identification label and comparing the identification to a schedule of equipment inactivation times. The systems and methods of the '101 patent may also provide remote interactions to reschedule deactivations or to protect the technician from hazardous conditions.

Nonetheless, the '101 patent does not provide a fully satisfactory solution. For example, the system of the '101 patent does not ensure that the machine is in a safe location prior to initiating maintenance. As may be appreciated from reading the following disclosure, there are other areas as well in which the '101 patent system falls short.

The present disclosure is directed to a system that addresses one or more of the problems set forth above. However, it should be appreciated that the solution of any particular problem is not a limitation on the scope of this disclosure nor of the attached claims except to the extent expressly noted. Additionally, the inclusion of any problem or solution in this Background section is not an indication that the problem or solution represents known prior art except as otherwise expressly noted.

SUMMARY OF THE DISCLOSURE

In accordance with one aspect of the present disclosure, a system is provided for facilitating a remote Lock Out/Tag Out (LO/TO) procedure on a machine. A LO/TO procedure is a safety procedure used to ensure that machines are properly shut off and not started again prior to completion of certain servicing work on the machine. Although the procedure may entail a physical tag being affixed to the machine, the term LO/TO as used herein does not require the use of specific physical tags, nor does it invariably require additional locking devices such as padlocks. The system includes a first wireless control device with communication capabilities resident in the machine, the first wireless control device being configured to sense a state of the machine including a machine location, and to provide an interface with an operator in the machine. A second wireless control device with communication capability is remote from the first wireless control device. The second wireless control device is configured to provide a control access point for a service technician remote from the machine and to wirelessly communicate with the first wireless control device so that the service technician is able to remotely perform a LO/TO procedure on the machine based at least in part on the machine location.

In accordance with another aspect of the present disclosure, a method is provided for executing a remote LO/TO procedure with respect to a machine via a remote control device with wireless communications capabilities. The machine includes a control device with wireless communications capabilities, and the method includes receiving a request at the remote control device from a remote service technician to initiate LO/TO of the machine. A request to initiate LO/TO is transmitted from the remote control device to the control device at the machine and a corresponding initiation request is displayed to an operator of the machine via the control device at the machine. An indication is received at the remote control device indicating that the machine is in a safe location and state for LO/TO. The machine is then locked out to the machine operator.

In accordance with yet a further aspect of the present disclosure, a method is provided for locking out a machine via a wireless control device that is remote from the machine. In this aspect, the method includes sending a lock-out initiation request from the remote wireless control device to the machine, receiving at the remote wireless control device from the machine an indication that the machine location and state are suitable for lock-out, and sending from the remote control device a lock-out command to the machine.

Other features and advantages of the disclosed systems and principles will become apparent from reading the following detailed disclosure in conjunction with the included drawing figures.

DETAILED DESCRIPTION OF THE DISCLOSURE

The present disclosure provides a system and method for remote Lock-out/Tag-out ("LO/TO") of a machine, including but not limited to construction equipment, material transportation equipment, surface and/or ground processing equipment, paving equipment, mining equipment and so on. In an embodiment, a system for remote LO/TO consists of a remote hand-held unit or control device with a display and/or interface working in conjunction with a display and/or interface onboard the machine. Within this embodiment, a remote service technician is able to contact a machine operator, e.g., via the hand-held control device, to initiate LO/TO procedures.

The operator of the machine acknowledges the communication and the system then automatically performs certain checks. For example, the system may check that the machine engine is off, the machine transmission is in an appropriate state, the machine service brake is activated, and so on. If one or more of the required conditions is not met, the display for one or both of the units may convey this to the technician and/or operator.

It is sometimes necessary to have a machine in a certain location for LO/TO. For example, it may be desirable to perform LO/TO in a secure service location away from a working location. To ensure that the machine is in an appropriate location for LO/TO, the system may compare positional data for the machine (e.g., based on GPS positioning) against acceptable sites, e.g., service locations. If the machine is in the field, i.e., not at the desired site, and LO/TO is nonetheless desired, the system may allow the lock out to occur upon receipt of an override command.

To disengage LO/TO, the system may, in addition to other checks, also compare locations of personnel in the machine vicinity. The locations of nearby personnel may be ascertained via visual detection and recordation, radar, CIODS (CATERPILLAR Integrated Object Detection System), LIDAR, Laser, and so on. If unauthorized personnel are found to be within a certain area around the machine, the system cannot be disengaged, and further actions such as the sending of one or more alerts may also be executed. Such an alert may be sent to all personnel associated with the LO/TO procedures. In an embodiment, the system requires multiple LO/TO requests from multiple personnel associated with the process.

Figure 1:
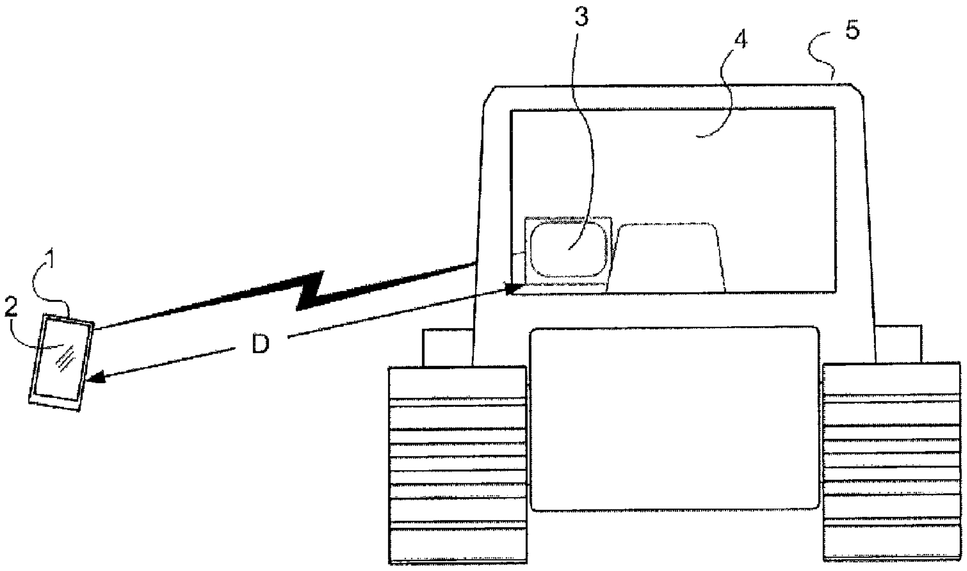
FIG. 1 is a system schematic diagram showing LO/TO system elements for implementing one or more embodiments of the disclosed principles.

Having discussed several embodiments in overview, we turn now to detailed descriptions of certain embodiments. FIG. 1 is a system schematic diagram showing LO/TO system elements for implementing one or more embodiments of the disclosed principles. The illustrated system includes a hand-held user device 1 for use by appropriate personnel, e.g., a service technician. The hand-held user device 1 may be either a dedicated device or a multipurpose device, such as an IPHONE, ANDROID, IPAD, or other multipurpose hand-held device configured and executing software configured to execute the processing, communication, and notification functions described later herein.

The hand-held user device 1 includes a device screen 2 and one or more user input mechanisms, not shown. The one or more user input mechanisms may include buttons, slider switches, touch switches, and so on. In an embodiment, the device screen 2 is a touch screen and provides a user input mechanism via virtual switches, button, selection boxes, and the like.

The hand-held user device 1 is configured for wireless communication via one or more wireless protocols including, for example, cellular communications protocols. In an embodiment, the device is configured to communicate over moderate range via at least one of the IEEE 802.xx suite of protocols. In use, the hand-held user device 1 is employed to communicate with a computing and display device 3 installed in or temporarily residing in a cab 4 of an earth-moving machine 5. The computing and display device 3 installed in or temporarily residing in the cab 4 is sometimes referred to herein as a local or hosted wireless communication device or local wireless control device, while the hand-held user device 1 may also be referred to as a remote wireless communication device or remote wireless control device. Although the illustrated earth-moving machine 5 is a track-type machine, it will be appreciated that the described techniques may be implemented with respect to any type of machine with respect to which LO/TO procedures are implemented.

The computing and display device 3, also referred to as a control device, may be a built-in computing device and monitor, such as a built-in computing system used for the described functions and other functions solely for the earth-moving machine 5. Alternatively, the computing and display device 3 may be a portable device much the same as the hand-held user device 1. In this case, the computing and display device 3 may be linked to the earth-moving machine 5 via BLUETOOTH, infrared (IR), or other short range wireless means to collect machine data and to ensure that the device is within the cab of the earth-moving machine 5 during LO/TO procedures.

In practice, the precise distance D between the hand-held user device 1 associated with the service technician and the computing and display device 3 associated with the earth-moving machine 5 is not important. However, in an embodiment, D is sufficient to allow for the safety of the service technician in the event that the earth-moving machine 5 moves in an unexpected way during LO/TO. In an embodiment, rather than a distance-based exclusion, a shaped exclusion zone or safety zone is used. Such a zone may allow personnel to be to the rear of the machine but not to the front within a certain area for example. Moreover, in addition to excluding personnel from certain areas as a prerequisite to LO/TO, is also desirable in an embodiment to exclude other machines and objects. To this end, the computing and display device 3 may communicate with an off-board data system such as a centralized work site system that maintains an updated work site map showing personnel, machines, and obstructions, as well as zones where machines may be serviced, exclusion zones, etc. In an alternative embodiment, the computing and display device 3 maintains an up-to-date work site map via periodic push or pull updates from the central system.

Figure 2:
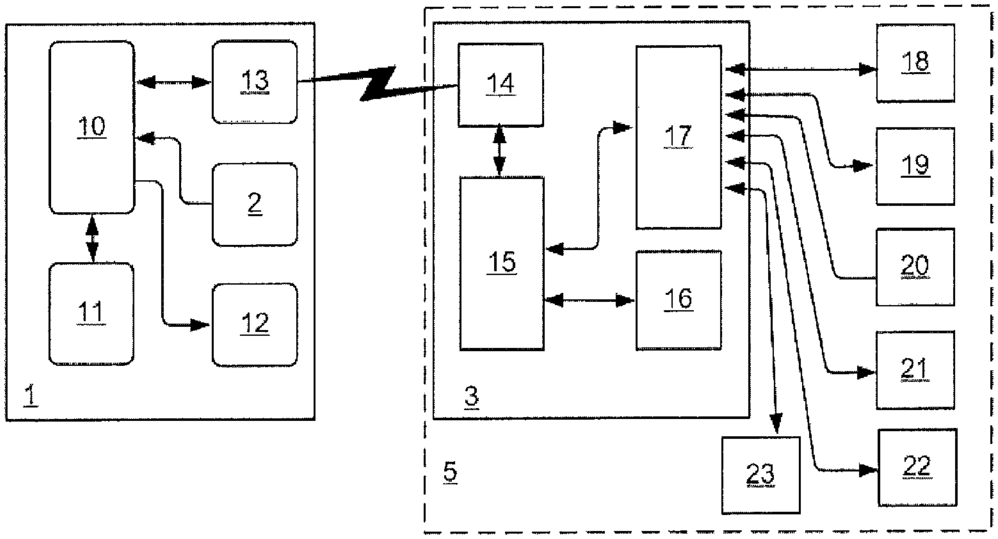
FIG. 2 is a detailed component schematic for implementing a remotely-initiated LO/TO procedure according to an embodiment.

Although the precise arrangement of components is not critical, a component schematic is illustrated in FIG. 2 corresponding to a certain embodiment. As shown, the hand-held user device 1 includes a digital processor 10 for executing the behavior of the hand-held user device 1. The digital processor 10 is a computing component that operates by retrieving computer-executable instructions from electronic memory 11 and executing them. It will be appreciated that the electronic memory 11 may also contain data and parameters, whether temporary or permanent, in addition to instructions.

For receiving user commands and other input, the hand-held user device 1 includes one or more user input mechanisms 12 read by the digital processor 10. The one or more user input mechanisms 12 may include any of the mechanisms listed above and others as desired. In order to convey information to the user of the hand-held user device 1, the device screen 2 is also linked to the digital processor 10. As noted above, in an embodiment, the device screen 2 also serves as a user input mechanism usable in conjunction with or in lieu of user input mechanisms 12.

The hand-held user device 1 includes a wireless communications module 13 for transmitting requests, commands, and data to and from the computing and display device 3 in the cab 4 of the earth-moving machine 5. The wireless communications module 13 may operate in accordance with any one or more suitable wireless protocols. In an embodiment, the wireless communications module 13 is adapted to communicate with the computing and display device 3 in the cab 4 of the earth-moving machine 5 via cellular communications.

The computing and display device 3 in the cab 4 of the earth-moving machine 5 includes a digital processor 15 in addition to a wireless communications module 14 for communicating with the hand-held user device 1. The digital processor 15 is linked to a digital memory 16 for storing instructions and data or parameters as discussed above. In particular, the digital processor 15 is a computing component that operates by retrieving computer-executable instructions from memory 16 and executing them. It will be appreciated that the memory 16 may also contain data and parameters, whether temporary or permanent, in addition to instructions.

In addition, the computing and display device 3 includes a machine interface unit 17 for interfacing to a plurality of machine systems for control and/or data gathering purposes. In an embodiment, the machine systems linked to the machine interface unit 17 include a machine transmission state sensor/actuator 18, a machine engine speed sensor/actuator 19, a machine location sensor unit 20, and a brake sensor 21 and brake actuator 22. In an embodiment, the machine location sensor unit 20 includes a global position system (GPS) sensor module for identifying a location of the machine 5 based on global positioning system data. In addition, an environment sensor module 23 is included as discussed above to identify nearby personnel, machines, or objects based on a mapping, e.g., from a centralized server, direct sensing, e.g., via LIDAR, and so on.

In an embodiment, the purpose of the machine transmission state sensor/actuator 18 is to sense the transmission state. In an alternative embodiment, the machine transmission state sensor/actuator 18 also is able to alter the transmission state, e.g., via an electrical or hydraulic actuator. Similarly, while the machine engine speed sensor/actuator 19 is configured to sense engine speed in an embodiment, in a further embodiment the machine engine speed sensor/actuator 19 is also operable to set the engine speed at a desired value, e.g., off or idle.

In operation, the service technician in possession of the hand-held user device 1 initiates a wireless transmission to the machine operator via the hand-held user device 1 and the computing and display device 3, to request that the operator allow service personnel to take control of the machine 5. In response, if service is to be performed, the operator parks the machine 5 in an appropriate place for maintenance to be undertaken. For LO/TO, the machine should be stopped with the park brake applied and the transmission in neutral. Optionally, the engine may also be required to be shut down.

The service technician then requests control of the machine 5 via hand-held user device 1 and computing and display device 3. In an embodiment, if the machine 5 is not in a safe state, e.g., if any of the location or state requirements are not met, then the hand-held user device 1 and the computing and display device 3 inform the technician and the operator of any states preventing LO/TO.

If the machine is in a safe state, then the computing and display device 3 request that the operator approve the remote lockout of the machine 5. At this point, the system may also require that the service technician acknowledge control of the machine. Once any required approvals are given, the computing and display device 3 engages a remote lock-out mechanism of the machine 5. The lock-out mechanism limits operation of the machine during servicing. For example, the system may not allow the machine engine to be started, but might allow other actions to be executed. Once the LO/TO is engaged, service personnel may be permitted to work on all or certain machine systems.

Once the service operation of interest is completed, the service technician may disengage the lock-out mechanism. In an embodiment, the service technician accomplishes this by moving to a safe distance from the machine 5 and entering a pass code in the hand-held user device 1 to access a LO/TO application through which the technician may then indicate a request to release the machine 5. If the machine 5 is in a safe state, then the computing and display device 3 releases the lock-out mechanism and optionally informs both the operator and the service technician.

If, however, the machine 5 is not in a safe state, then the computing and display device 3 informs the technician and operator of any state that is preventing the computing and display device 3 from disengaging the Lock-out.

Figure 3:
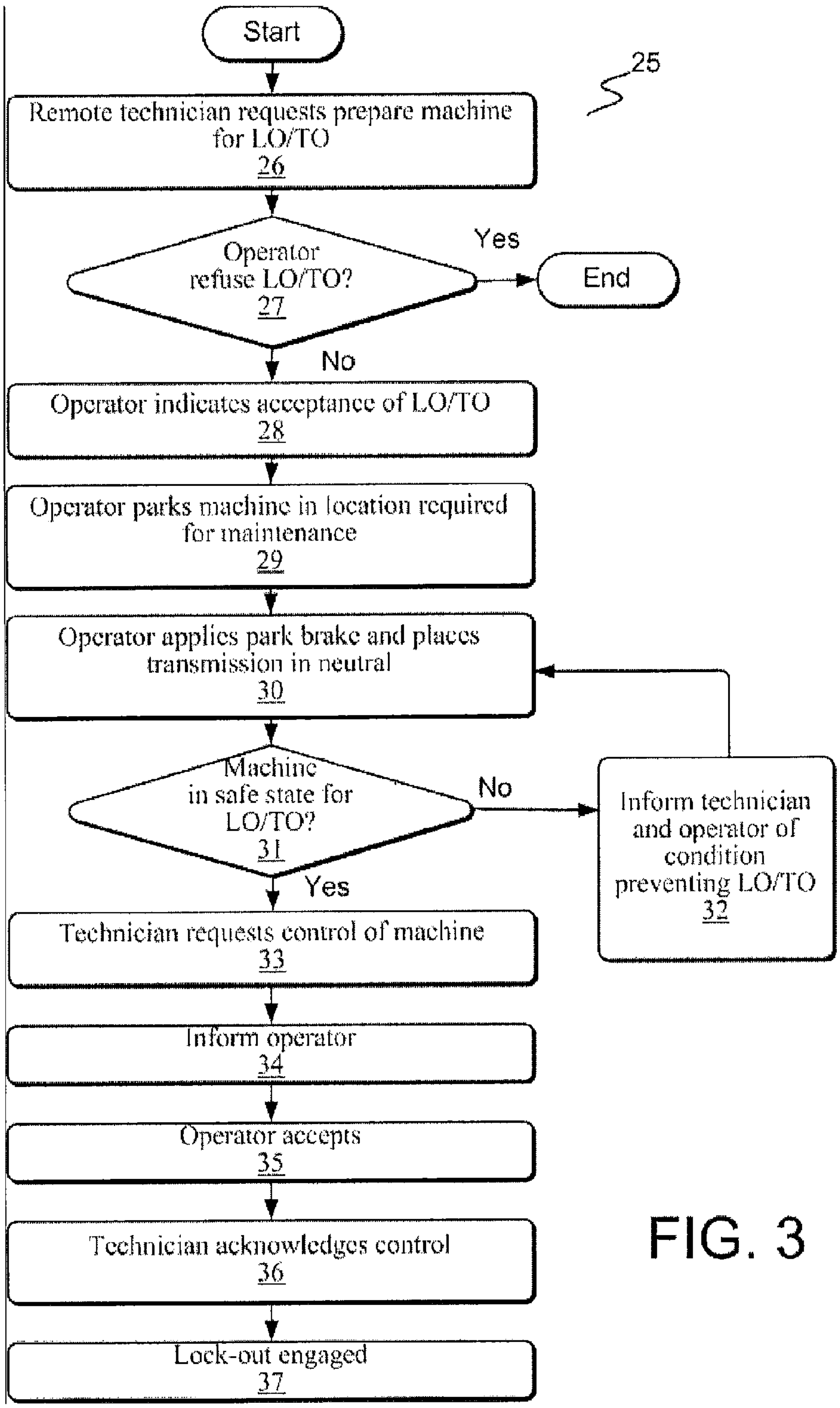
FIG. 3 is a flow chart illustrating a process for remotely-initiated LO/TO in an embodiment of the disclosed principles.

Having reviewed the LO/TO procedure in overview, a detailed process 25 for executing lock-out engagement is shown in FIG. 3. The process 25 begins at stage 26 with the remote service technician requesting via the hand-held user device 1 that the machine operator prepare the machine 5 for LO/TO. If the machine is being used for a process that cannot be interrupted, or if the machine operator otherwise has reason to refuse the LO/TO at this time, the operator may refuse the LO/TO request at stage 27. In this case, the process 25 terminates, but may be restarted by either party at another time. In an embodiment, the operator sends a message to the hand-held user device 1 as to why the LO/TO request was denied.

If instead the operator would like to have the service performed, he or she acquiesces at stage 28 to the request, e.g., by making an appropriate selection or indication via the computing and display device 3. At stage 29, the operator parks the machine 5 in a location required for maintenance to be undertaken. Once in the proper location, the operator applies the park brake and places the transmission in neutral at stage 30. As noted above, the operator optionally also turns off the machine engine at this point. In an embodiment, preparation for LO/TO entails eliminating or reducing positive pressure created by implement position. Thus, for example, the operator may lower booms or other hydraulic implements, lower tools, etc. On a track type tractor, the operator may lower and engage a ripper, etc. to ensure that any potential hydraulic or gravitational energy cannot harm a service technician. The state of the hydraulic implements is referred to as the machine implement status, and the status is considered safe when the implements are lowered, stopped, and there is no potential hydraulic or gravitational energy in the system that may harm a technician.

At stage 31, the computing and display device 3 determines whether the machine 5 is in a safe state for LO/TO. If it is determined that the machine 5 is not in a safe state, e.g., if any of the location or state requirements are not met, then the hand-held user device 1 and the computing and display device 3 informs the technician and the operator of any condition preventing LO/TO at stage 32. From stage 32, the process 25 loops back to stage 31 to verify that the noted problems have been corrected.

If instead it is determined at stage 31 that the machine 5 is in a safe state for LO/TO, the service technician requests control of the machine 5 via the hand-held user device 1 at stage 33. The computing and display device 3 informs the operator of the request at stage 34, e.g., via a visual prompt. In an embodiment, the operator confirms acceptance of LO/TO at the computing and display device 3 at stage 35 after which the service technician acknowledge control of the machine via the hand-held user device 1 at stage 36. At stage 37, the computing and display device 3 engages the remote lock-out mechanism of the machine 5 to prevent operation of the machine during servicing.

Figure 4:
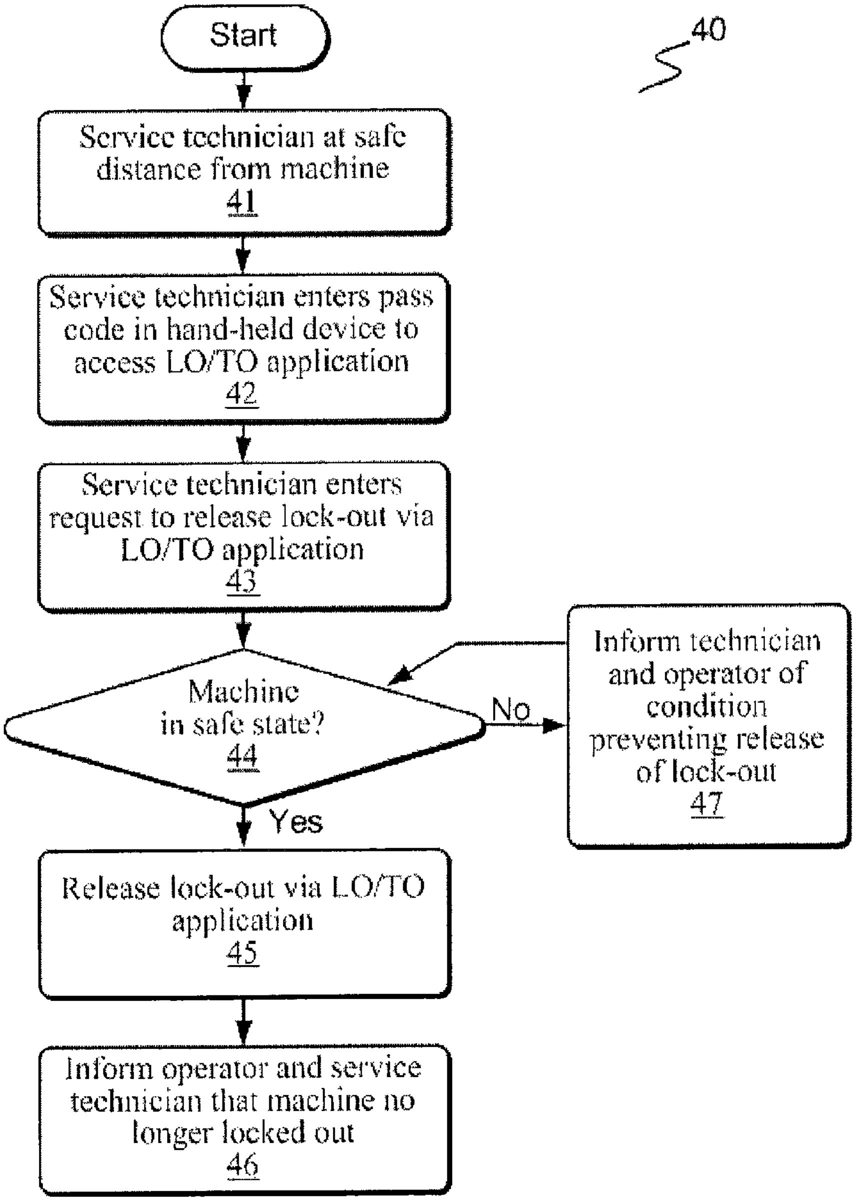
FIG. 4 is a flow chart illustrating a process for LO/TO release in accordance with an aspect of the disclosed principles.

As noted above, once the service operation of interest is completed, the service technician may disengage the lock-out mechanism. An exemplary disengagement process 40 is shown in FIG. 4. In the illustrated embodiment, the service technician first positions himself or herself a safe distance from the machine 5 at stage 41. The safe distance depends upon the machine 5 of interest, and in an embodiment the safe distance is twice the span of any machine implement. For example, a machine with a 10 foot boom might have a safe distance of 20 feet. It will be appreciated that other distance metrics may be used without departing from the principles disclosed herein.

The service technician then enters a pass code in the hand-held user device 1 at stage 42, accessing the LO/TO application. At stage 43, the technician indicates a request to release the machine 5 from within the LO/TO application. At stage 44, the computing and display device 3 determines whether the machine 5 is in a safe state. If the machine 5 is in a safe state, the computing and display device 3 releases the lock-out mechanism at stage 45. If the machine 5 is not in a safe state, the process 40 progresses to stage 47 and informs the technician and operator of any state that is preventing disengagement of the lock-out. From stage 47, the process 40 returns to stage 44 to await an indication that the machine 5 has entered a safe state.

Once the lock-out mechanism is released at stage 45, the computing and display device 3 may inform both the machine operator and the service technician at stage 46 that the machine 5 is no longer locked out.

Figure 5:
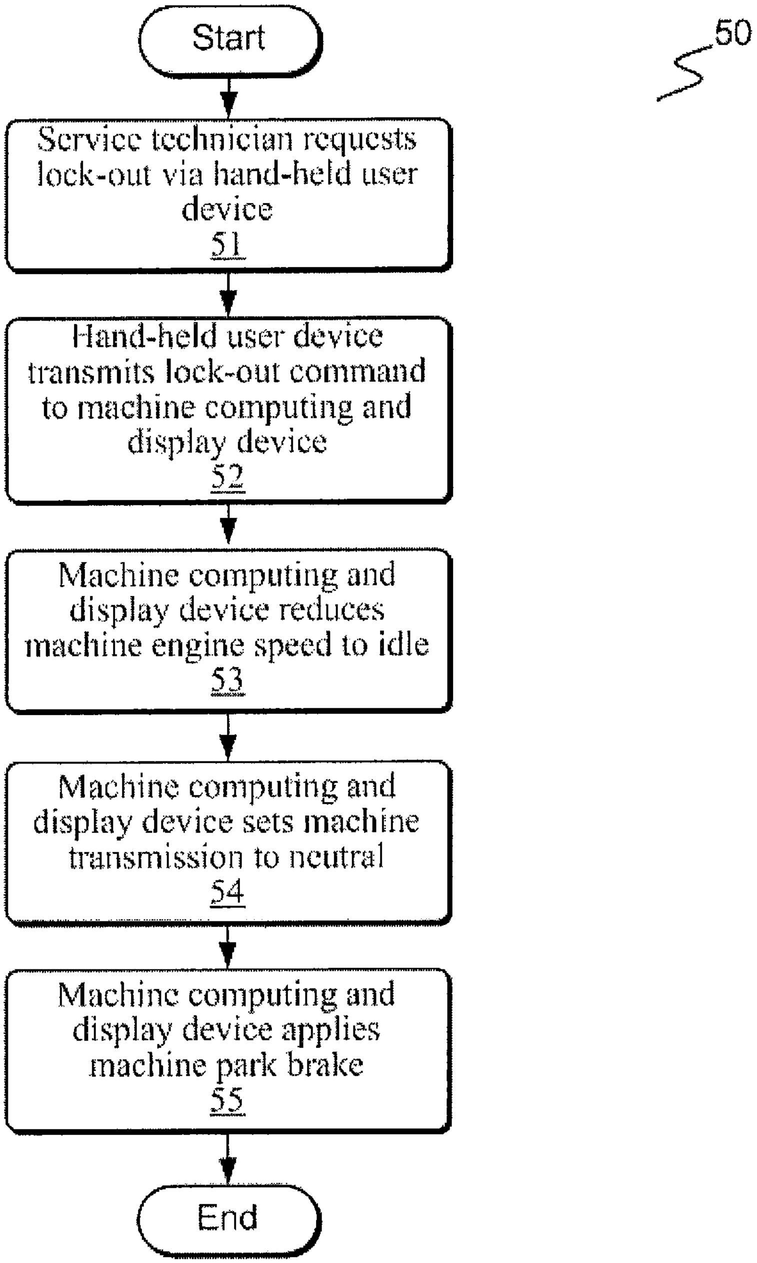
FIG. 5 is a flow chart illustrating a process for forced lock-out in accordance with an aspect of the disclosed principles.

In an embodiment, the LO/TO procedure may be executed without operator involvement. For example, the operator of the machine 5 may be incapacitated or may not be present in the cab 4. Alternatively, the operator in the machine 5 may not be authorized to operate the machine 5. In this embodiment, illustrated via the flow chart of FIG. 5, the lock-out process 50 begins when the service technician requests a lock-out via the hand-held user device 1 at stage 51. The hand-held user device 1 transmits a corresponding lock-out command to the computing and display device 3 at stage 52.

At stage 53, the computing and display device 3 reduces the engine speed of the machine 5 to idle. In an embodiment, the computing and display device 3 shuts the engine down at stage 53. The computing and display device 3 sets the machine 5 transmission to neutral at stage 54, and applies the park brake at stage 55. In an embodiment, the lock-out thus engaged may be overridden from the hand-held user device 1 or the computing and display device 3 by entry of the pass code. In this way, an authorized operator cannot be unilaterally locked out, and in the same way, an unauthorized operator cannot prevent the service technician from unilaterally performing the lock-out.

In an embodiment, a machine identification code is used by the remote technician in addition to a pass code to execute LO/TO or a forced lock-out. In this way, a technician need not be near the machine of interest to execute the LO/TO or forced lock-out. In conjunction with this embodiment, the mode of communication between the hand-held user device 1 and the computing and display device 3 may be cellular, WAN, or other extended range protocol to allow for greater distance between the technician and the machine.

In a further embodiment wherein long range LO/TO or forced lock-out is facilitated, the hand-held user device 1 may be replaced by a less portable device such as a personal computer, remote laptop computer, workstation, etc.

Industrial Applicability

In general terms, the present disclosure sets forth a system and method applicable to earth-moving machines and other industrial machines wherein it is desired to provide a safe remote LO/TO procedure. In addition, the described principles find application in the prevention of unauthorized access to such machines.

A remote technician (herein used to refer to any remote personnel requiring access to or control of the machine to perform an operation thereon) is provided with a wireless device having thereon an application for facilitating the remote LO/TO. As noted above, the wireless device may be any device capable of running an application and providing the necessary wireless communications. As was noted, the remote personnel may utilize a portable or non-portable device, the device being either dedicated or multipurpose. As used herein, cellular communications are considered to be wireless communications.

The LO/TO application running on the wireless device and on the computer system of the machine is executed via the computerized execution of instructions stored on a nontransitory computer-readable medium or memory, e.g., a disc drive, flash drive, optical memory, ROM, etc. The LO/TO application at the technician's device may be started at the technician's request. In contrast, in an embodiment, the LO/TO application on the computer system of the machine may be always on while the machine is operating to facilitate LO/TO upon the technician's request.

To disengage LO/TO, the system may locate personnel, e.g., via radio frequency identification (RFID) or otherwise, in the machine vicinity. In an embodiment, identified personnel are then compared to the identities of known authorized personnel and if unauthorized personnel are found to be within a predetermined area around the machine, the system will not disengage the lock-out. Further actions such as the sending of one or more alerts may also be executed. Such an alert may be sent to all personnel associated with the LO/TO procedures.

In an embodiment, the system requires multiple LO/TO requests from multiple personnel associated with the process in order to disengage a lock-out. For example, in an embodiment, disengagement of the lock-out requires that both the service technician and a supervisor enter a passcode.

It will be appreciated that the present disclosure provides a system and method for facilitating remote LO/TO, unilateral lock-out, and LO/TO or lock-out disengagement. While only certain embodiments have been set forth, alternatives and modifications will be apparent from the above description to those skilled in the art. These and other alternatives are considered equivalents and within the spirit and scope of this disclosure and the appended claims.

What is claimed is:

1. A system for facilitating a remote Lock Out/Tag Out (LO/TO) procedure on a machine, the system comprising:

a first wireless control device resident in the machine, the first wireless control device being configured to sense a state of the machine including positional data for the machine, and to provide a user interface to an operator of the machine; and a second wireless control device remote from the first wireless control device, the second wireless control device being configured to provide a user interface to a service technician located at a distance that is remote from the machine and to wirelessly interface with the first wireless control device such that the service technician is able to remotely perform a LO/TO procedure on the machine only if the machine is in a proper location required for machine maintenance to be undertaken.

2. The system for facilitating a remote LO/TO procedure according to claim 1, wherein the first wireless control device is built into the machine.

3. The system for facilitating a remote LO/TO procedure according to claim 1, wherein the first wireless control device is located in a cab of the machine.

4. The system for facilitating a remote LO/TO procedure according to claim 3, wherein the first wireless control device is a portable wireless device.

5. The system for facilitating a remote LO/TO procedure according to claim 1, wherein state of the machine further includes one or more of machine transmission status, machine engine speed, machine implement system status and machine brake status.

6. The system for facilitating a remote LO/TO procedure according to claim 5, wherein the second wireless control device is configured to remotely perform the LO/TO procedure on the machine after verifying the transmission status is neutral, an engine speed status is one of off and idle, an implement status is safe, and a parking brake is applied.

7. The system for facilitating a remote LO/TO procedure according to claim 5, wherein the first wireless control device is configured and connected to control one or more of the machine transmission, machine engine, and machine brake.

8. A method for executing a remote LO/TO procedure with respect to a machine via a remote wireless control device, the machine having therein a local wireless control device, the method comprising:

receiving a request at the remote wireless control device input by a remote service technician to initiate LO/TO of the machine;

transmitting a request to initiate LO/TO from the remote wireless control device to the local wireless control device and displaying a corresponding initiation request to an operator of the machine via the local wireless control device;

receiving an indication from the local wireless control device at the remote wireless control device of positional data for the machine and a machine state for LO/TO; and locking out the machine to the operator only in response to determining at the remote wireless control device that the machine is in a proper location required for maintenance of the machine to be undertaken and the machine is in a safe state for LO/TO.

9. The method for executing a remote LO/TO according to claim 8, further comprising, prior to locking out the machine:

receiving a control request at the local wireless control device from the remote wireless control device to cede control of the machine to the remote service technician;

informing the operator of the machine of the control request;

receiving at the hosted wireless control device an operator acceptance of LO/TO input by the operator at the local wireless control device; and transmitting an indication of the operator acceptance to the remote service technician via the remote wireless control device.

10. The method for executing a remote LO/TO according to claim 9, wherein informing the operator of the machine of the request includes providing a visual prompt to the operator.

11. The method for executing a remote LO/TO according to claim 8, further comprising, receiving at the remote wireless control device an acknowledgement of control of the machine input by a service technician.

12. The method for executing a remote LO/TO according to claim 8, wherein receiving an indication from the local wireless control device at the remote wireless control device that the machine is in a proper location required for maintenance of the machine to be undertaken and the machine is in a safe state for LO/TO includes receiving an indication that a machine park brake is applied, a machine transmission is in neutral, a machine implement status is safe and a machine engine is at a specific speed.

13. The method for executing a remote LO/TO according to claim 12, wherein receiving an indication that the machine engine is at a specific speed includes receiving an indication that the machine engine state is one of off and idle.

14. The method for executing a remote LO/TO according to claim 8, wherein receiving an indication from the local wireless control device at the remote wireless control device that the machine is in a proper location required for maintenance of the machine to be undertaken and the machine is in a safe state for LO/TO further comprises:

determining that the machine is not in the safe state;

informing the operator and remote service technician of a condition preventing LO/TO; and receiving an indication that a condition causing the machine to not be in the safe state has been corrected.

15. A method of locking out a machine via a remote wireless control device that is remote from the machine comprising:

sending a lock-out initiation request from the remote wireless control device to the machine;

receiving at the remote wireless control device from the machine an indication that a positional data for the machine and a machine state are suitable for lock-out; and sending from the remote wireless control device a lock-out command to the machine only in response to determining that the machine is in a proper location required for maintenance of the machine and that the machine is in a safe state.

16. The method of locking out a machine via a remote wireless control device according to claim 15, wherein the indication that positional data for the machine and the machine state are suitable for lock-out indicates that a machine transmission is in neutral, a machine engine is in a state that is one of off and idle, a machine implement status is safe and a machine park brake is applied.

17. The method of locking out a machine via a remote wireless control device according to claim 15, wherein the remote wireless control device communicates with the machine via a wireless protocol.

18. The method of locking out a machine via a remote wireless control device according to claim 15, wherein the remote wireless control device communicates with the machine via a cellular protocol.

19. The method of locking out a machine via a remote wireless control device according to claim 15, wherein receiving an indication that positional data for the machine and the machine state are suitable for lock-out further comprises:

first receiving at the remote wireless control device an indication that positional data for the machine does not indicate that the machine is in a proper location required for machine maintenance to be undertaken and the machine is not in a safe state for lock-out and an identification of a condition preventing lock-out; and secondly receiving an indication that the identified condition preventing lock-out has been corrected.

20. The method of locking out a machine via a remote wireless control device according to claim 15, wherein the remote wireless control device is one of a Laptop device, desktop device, IPHONE, IPAD, cellular phone, and ANDROID device.

* * * * *